United States Patent Office 3,632,752
Patented Jan. 4, 1972

3,632,752
CERTAIN DI AND TRIIODOBENZOIC ACIDS AS GROWTH PROMOTANTS
James H. Ware, Lake Bluff, Ill., assignor to International Minerals & Chemical Corporation
No Drawing. Filed Aug. 5, 1966, Ser. No. 570,431
Int. Cl. A61k *21/00, 27/00*
U.S. Cl. 424—177                            10 Claims

ABSTRACT OF THE DISCLOSURE

Compounds of 2,3,5-triiodobenzoic acid and 2,5-diiodobenzoic acid increase the growth of poultry, ruminants and swine when administered in the amount of about 0.0001 to 0.1% by weight of the daily feed consumption of the animal.

Numerous materials have been proposed in the prior art for use as growth-promoting agents for animals normally raised for their meat value. Many of these have not been economically feasible due to a low level of effectiveness coupled with relatively high cost. Among the agents which do find widespread use, however, are the hormone-type compounds such as diethylstilbestrol and the various antibiotics such as chlortetracycline and the like. The search has continued in the art for additional agents capable of effecting improved growth-promoting characteristics in animals, and particularly for low-cost agents.

It has now been found that 2,3,5-triiodobenzoic acid as well as 2,5-diiodobenzoic acid and 3,5-diiodobenzoic acid, and the pharmaceutically acceptable salts, esters, thioesters and amides of these acids can be employed as non-toxic growth-promoting agents for animals such as swine, poultry and ruminants. While all of the foregoing are digestible, non-toxic, and growth-promoting, the triiodo compounds and the 2,5-diiodo compounds have been found to be particularly effective. The agents are administered orally to animals by incorporating them into the animals' feed or water suply, or other liquid intake. When the agents are employed in the water supply, the compounds should of course be water soluble or at least dispersible. Compounds of limited water solubility can first be dissolved in a mutual solvent, such as ethanol, and then added to the water.

Thus, the present invention advantageously provides a means whereby the rate of weight gain and feed conversion efficiency of anmials is increased in an efficient and economical manner. More specifically, by the use of growth-promoting amounts of the particular triiodo-and diiodobenzoic acid additives of the present invention, the rate of weight gain of animals is increased by up to 5% and higher. Such improvements are extremely attractive in that the particular additives are available in relatively large amounts and are appreciably less expensive than hormone and antibiotic-type growth-promoting agents conventionally employed. Further, the use of the growth-promoting agents of the present invention has the further advantage of providing the desired growth-promotion effects without causing undesirable physical side effects such as tend to be characteristic of the use of hormone-type agents.

Substances heretofore successfully employed as growth-promoting agents in animal feed compositions were known to effect the normal biological processes of animals and gained their effectiveness by virtue of an imbalance of the animal's hormone, antibiotic, and/or vitamin levels. The additives of the present invention are unknown to animals' normal biological mechanisms, and it is highly surprising and unexpected that they display growth-promoting characteristics when administered to animals.

As was noted previously, the agents may be used in a number of chemical modifications. In general, the preferred usage of the agents is in the form of the acid, i.e., 2,3,5-triiodobenzoic acid, 2,5-diiodobenzoic acid or 3,5-diiodobenzoic acid. In some instances, however, it may be desirable to modify the compounds to make them, for example, more water soluble or to provide an additional source of other nutrients or minerals in conjunction with the agents. Thus, the amine salts of the acids can be employed and would include the salts of 2,3,5-triiododbenzoic acid, 2,5-diiodobenzoic acid and/or 3,5-diiodobenzoic acid with alkyl amines including, inter alia, monomethyl amine, monoethyl amine, dimethyl amine, diethyl amine, dipropyl amine, dibutyl amine, trimethyl amine, triethyl amine, tripropyl amine and tributyl amine; the alkanol amines including, inter alia, monoethanol amine, diethanol amine, triethanol amine, monopropanol amine, dipropanol amine and tripropanol amine; the quaternary ammonium compounds including, inter alia, tetramethyl amine, ethyl trimethyl amine, propyl trimethy lamine, hexyl trimethyl amine, cyclohexyl trimethyl amine, benzyl trimethyl amine; and heterocyclic amines including, inter alia, piperazine, pyrazine, and piperidine.

Not only the organic salts of the acids are useful, but also the inorganic salts of 2,3,5-triiodobenzoic acid, 2,5-diiodobenzoic acid and 3,5-diiodobenzoic acid may be used to provide water-soluble forms of the agents and/or to supply certain mineral elements sometimes desirable in the animals' diet. Typical of such inorganic salts are the ammonium salts; alkali metal salts, e.g., sodium and potassium; alkaline earth metal salts, e.g., calcium, magnesium, and barium; and heavy metal salts, e.g., manganese, zinc, iron, cobalt, copper and aluminum, of 2,3,5-triiodobenzoic acid, 2,5-diiodobenzoic acid and 3,5-diiodobenzoic acid.

Esters of the agents of the present invention may also be employed. Typically, these esters may be the esters of the above-identified specific triiodo- and diiodobenzoic acids with alkanols such as methanol, ethanol, n-propanol, isopropanol, n-butanol, isobutanol, n-pentanol, n-hexanol, isohexanols, n-heptanol, isoheptanols, n-octanol, isooctanols, n-nonanol, isononanols, n-decanol, isodecanols, tridecanol, lauryl alcohol; cycloalkanols such as cyclobutanol, cyclopentanol, and cyclohexanol; alkenols such as allyl alcohol, 1,4-butyne-3-diol, and the like; polyols such as ethylene glycol, diethylene glycol, glycerol, mannitol, sorbitol, and the like; aryl alkyl alcohols such as benzoalcohol, phenyl ethyl alcohol, naphthyl methyl alcohol, and the like; phenolic compounds such as phenol, zylanol, salicyclic acid, galactic acid, and the like, as well as the corresponding thio compounds.

Further amides of the acids may be employed in accordance with the present invention and include without limitation, 2,3,5-triiodobenzamide, 2,5-diiodobenzamide, 3,5-diiodobenzamide and the N-alkyl derivatives thereof, e.g., methyl, ethyl, propyl, dimethyl, diethyl dipropyl, n-hexyl, dihexyl, di-2-ethyl hexyl, decyl, didecyl, tridecyl, lauryl, dilauryl, methyl lauryl, dimethyl lauryl, stearol, tetradecyl, hevadecyl, and the like derivatives thereof.

It has additionally been found that the use of antibiotics in combination with the additives of the present invention provides a greater weight gain increase in the animals fed wth the combination that would be expected by data obtained on feeding either constituent alone. Typically, such antibiotics include bacitracin and tetracycline antibiotics such as chlortetracyline, oxytetracycline and like compounds.

It is essentially impossible to state a set fixed amount of the additives of the present invention which are to be administered to the animals, since this will obviously vary with the type of animal and the age of the animal. In general, however, the dosage rate can be equated to the feed intake of the animal. Thus, whether they are poultry, swine or ruminants, a dosage as low as about 12 grams per ton of feed consumed by the animals has been found to provide significant growth improvement in the animals. A dosage at the rate level of 50 grams per ton of feed consumed has been found to be significantly better, and the maximum effect appears to be observed at around 150 grams of additive per ton of feed consumed. Dosages significantly greater than this amount, e.g., two or three times this amount, do not show a significant increase in effect on the animals consuming the treated feed. Obviously, excessive dosages of the additives can be expected to exert a harmful or toxic effect. Fortunately, the additives of the present invention do not show indications of toxicity until dosage levels in the order of 2,000 to 9,000 grams per ton of feed consumed are reached. Even at these levels, the evidence of toxicity manifects itself only to a limited extent in the form of reduced growth rate as compared to control and an increase in the death rate. However, even at these levels, there is not a total kill of the animals. Since the toxic dose is several orders of magnitude greater than the effective dosage, there is no significant danger in the use of these additives in animal feeds.

Thus, in accordance with the present invention, the 2,3,5 - triiodoherizoic acid. 2,5-diiodobenzoic acid, 3,5-diiodobenzoic acid and the corresponding derivatives of these acids are administered orally to the animals to be treated at a dosage equivalent to a dosage of about 0.0001% to about 0.1% by weight of feed consumed. Dosages on the order of 0.5% and higher are to be avoided and indeed feed dosages at the rate of 0.1% are excessive, although some growth increase is obtained when a diet containing treating agents in the amount of 0.0001% to 0.1% by weight of the feed is fed for at least four weeks. Thus, the feed dosage is preferably maintained below about 0.1% by weight of the total feed consumed and is preferably in the range of about 0.0002% to about 0.02%. As was noted, the treating agents of the present invention can be administered in the drinking water or other liquids consumed by the animal. The concentration of the treating agents in the particular liquid would not, of course, necessarily coincide with the concentration of the treating agents in feed if feed were the sole source of administration of the agent. However, the concentration can be determined readily from the known average liquid consumption by the animal and the known average feed consumption by the animal. Thus, for example, for any given animal having a daily feed consumption of X pounds and a daily water consumption of Y gallons, where it is desired to feed the animal at, for example, the 0.01% dosage rate, but with all of the treating agent administered through the water supply, the water would have a concentration of 0.0001 X/Y pounds per gallon to administer the desired doage. Similar calculations can be made where it is desired to split the dosage between the water supply and the feed intake. In general, however, it will be found advantageous to include the additive with the feed material as the sole method of administration of the compounds.

There does not appear to be any criticality as to the quantity of antibiotic included with the various additives of the present invention. In general, dosages in excess of about 100 parts per million, that is, about 0.01% of the feed consumed by the animal, are unnecessary. Any lesser amounts are useful, but are particularly effective when the level reaches 0.0025% up to about 0.0075% of the feed consumed.

The invention will be illustrated by the treatment of chickens with 2,3,5-triiodobenzoic acid. This is not, however, to be considered as a limitation on the present invention which is broadly directed to the treatment of poultry, swine and ruminants, and in particular to chickens, turkeys, cattle, sheep and swine.

Three diets were prepared for feeding the chickens at various stages of growth. Diet A was fed during the first three weeks. Diet B was fed from the third to the sixth week. Diet C was fed during the sixth and seventh weeks. The composition of the three diets is shown in Table 1.

TABLE 1

Composition of experimental diets

| | Diet A, percent | Diet B, percent | Diet C, percent |
|---|---|---|---|
| Ingredients: | | | |
| Yellow corn meal | 55.00 | 58.48 | 61.68 |
| Soybean meal (50% protein) | 26.50 | 23.00 | 17.00 |
| Fish meal (60% protein) | 5.00 | 5.00 | 5.00 |
| Corn gluten meal | 5.00 | 5.00 | 5.00 |
| Corn distillers dried solubles | 2.50 | 2.50 | 2.50 |
| Alfalfa meal | | | 2.50 |
| Dicalcium phosphate | 1.39 | 1.20 | 0.98 |
| Calcium carbonate | 0.75 | 0.63 | 0.43 |
| Hydrogenated fat | 0.33 | 3.29 | 3.91 |
| NaCl (iodized) | 0.25 | 0.25 | 0.25 |
| $MnSO_4 \cdot H_2O$ | 0.02 | 0.02 | 0.02 |
| $ZnCO_3$ | 0.0125 | 0.0125 | 0.0125 |
| Ethoxyquin (anti-oxidant) | 0.01875 | 0.01875 | 0.01875 |
| Vitamin mix | 0.238 | 0.238 | 0.238 |
| Protein, percent | 24.0 | 22.5 | 20.1 |
| Metabolizable energy, cal./lb | 1,440 | 1,465 | 1,470 |
| Calcium, percent | 1.0 | 0.9 | 0.8 |
| Available phosphorus | 0.5 | 0.45 | 0.4 |

The available phosphorus constituted both supplemental inorganic phosphorus plus non-phytin phosphorus in the diet. The vietamin mixture is shown in Table 2.

TABLE 2

| Ingredients: | Mg./kg. of diet |
|---|---|
| Vitamin A (500 I.U./gm.) | 100.0 |
| Vitamin $D_3$ (30,000 I.C.U./gm.) | 2.5 |
| d-Alpha Tocopheryl acetate (250 mg./gm.) | 20.0 |
| Menadione sodium bissulfite | 0.025 |
| Choline chloride (80%) | 109.400 |
| Vitamin $B_{12}$ (0.1%) | 1.50 |
| Riboflavin | 0.35 |
| Niacin | 3.00 |
| d-Ca pantothenate | 1.00 |

In the first series of tests, the feed composition contained no antibiotics. The results of the tests are shown in Table 3. In the table, TIBA stands for the 2,3,5-triiodobenzoic acid. The F/G ratio represents the ratio of the grams of feed consumed per gram of weight gain. Each number in the table represents an average value for three replicates of ten chicks per replicate.

TABLE 3

| TIBA, percent | Initial wt., gm. | Final wt., gm. | 7-wk- gain, gm. | Feed consumption, gm. | F/G |
|---|---|---|---|---|---|
| 0.000 | 44 | 1,586 | 1,541 | 2,680 | 1.77 |
| 0.005 | 44 | 1,592 | 1,549 | 2,787 | 1.80 |
| 0.010 | 43 | 1,630 | 1,587 | 2,839 | 1.79 |
| 0.020 | 44 | 1,616 | 1,572 | 2,866 | 1.84 |

Essentially the same tests were repeated except that the feed contained 25 p.p.m. of bacitracin and 25 p.p.m. of chlortetracycline in each case, or a total antibiotic concentration of 0.005%. Results of these tests are shown in Table 4 in which the abbreviations and symbols have the same significance as discusssed with respect to Table 3.

TABLE 4.—PERFORMANCE OF CHICKS FED TIBA-WITH ANTIBIOTICS

| TIBA, percent | Initial wt., gm. | Final wt., gm. | 7-wk- gain, gm. | Feed consumption, gm. | F/G |
|---|---|---|---|---|---|
| 0.000 | 44 | 1,580 | 1,536 | 2,757 | 1.79 |
| 0.005 | 44 | 1,653 | 1,610 | 2,889 | 1.79 |
| 0.010 | 43 | 1,688 | 1,645 | 2,925 | 1.80 |
| 0.020 | 43 | 1,670 | 1,627 | 2,871 | 1.77 |

As will be seen by comparing the data of Tables 3 and 4, the inclusion of the 2,3,5-triiodobenzoic acid in the feed supplement of the chicks significantly increased the weight of the chicks as compared with chicks receiving the same diets without the additive. As is further evident, the inclusion of antibiotics with the additives gave a still greater rate of weight gain than was attained with the additive alone. The inclusion of the antibiotics alone did not increase weight gain. This is established by a comparison of the results at the zero TIBA level in Tables 3 and 4. The greatest response came when TIBA was added at the level of 100 parts per million. Feed efficiency as measured by the feed-to-gain ratio was essentially the same on all treatments.

The use of 2,5-diiodobenzoic acid as an additive provides a similar improvement in weight gain as compared to the weight gain of the chicks in the absence of the additive.

Similar tests were conducted with swine. Thirty-two crossbred pigs of about four weeks of age were allotted to four different groups of eight pigs each. Two groups received the diet shown in Table 5. The other two groups received the same diet containing 0.01% of 2,3,5-triiodobenzoic acid. The tests were conducted for a four-week period.

TABLE 5

| Ingredients: | Percent |
|---|---|
| Yellow corn | 22.3 |
| Rolled oats | 35.0 |
| Soybean meal | 20.0 |
| Dried skim milk | 5.0 |
| Dried whey | 15.0 |
| Dicalcium phosphate | 1.0 |
| Ground limestone | 1.0 |
| Trace mineralized salt | 0.5 |
| Vitamin mix | 0.2 |
| | 100.0 |

The additive was introduced into the mixture in place of an equivalent quantity of corn. The vitamin mix in the diet is set forth in Table 6.

TABLE 6

| Ingredient: | Mg./kg. of diet |
|---|---|
| Vitamin A (5000 I.U./gm.) | 1321.0 |
| Vitamin $D_3$ (30,000 I.U./gm.) | 132.1 |
| Riboflavin | 2.2 |
| Ca pantothenate | 11.0 |
| Niacin | 33.0 |
| Choline chloride (80%) | 220.0 |
| Vitamin $B_{12}$ (0.1%) | 0.035 |

The first two replicates showed an average total gain of 8.79 kilograms and 8.01 kilograms or an average of 8.40 kilograms gain for the four-week test period. The feed-to-gain ratio was an average of 2.07 for these replicates. The replicates treated in accordance with the present invention showed an average total gain of 9.34 and 9.49, respectively, or an average of 9.42 kilograms for the four-week period. The average feed-to-gain ratio for the two replicates was 1.86.

Similar weight gains can be obtained by using 2,5-diiodobenzoic acid as well as the salts, both inorganic and amine, and esters, thio esters and amides of the specific diiodo- and triiodobenzoic acids employed for the purposes of the present invention. In addition, similar weight gains can be attained in cattle, sheep, turkeys and other ruminants and poultry by the inclusion of the additives either alone or in combination with antibiotics in the manner illustrated herein with chickens and swine. While it is recognized that the actual total intake of the additive will vary from animal to animal, the dosages based on feed consumption will be generally applicable to all of the animals treated. There is of course wide variation possible insofar as the actual composition of the feeds themselves are concerned. There is no one accepted formula for any particular animal. However, guidelines can be found in the 1950 National Research Council recommendations of minimum nutrient allowances for the early life stages of chicks, pigs, calves, lambs and other farm animals. In general, the major portion of the feed is made up of plant ingredients, such as the several meals obtained from processing oil seeds as well as the grain products themselves. A minor amount of mineral ingredients to supply calcium and phosphorous, as well as minor amounts of salts of iodine, potassium, manganese, magnesium, copper, iron and the like are included. Such basic feed is sometimes supplemented with animal ingredients, such as fish meal, meat scraps, etc. As should be noted from the examples, vitamin ingredients are also commonly included.

As was noted previously, the additives of the present invention can be incorporated directly into the animals' feed rations or in the liquid intake. In addition, they can be included in feed supplements which can be mixed with the normal feed ration or used as a feed top dressing. Typically, oil-soluble forms of the additives could be mixed with a vegetable oil or like material, and poured on the feed ration or mixed therewith. Again concentrations of the ingredients could be calculated based on the normal intake expectation of the animal.

The precise period during which the maximum effect from the additives of the present invention are noticed will depend to some extent on the nature of the animal being treated, including its genetic growth capability, state of health, and the nutritional quality of the diet being consumed. In general, the greatest effect is noted when the additives are fed continuously for a substantial part of the active growth cycle. Accordingly, in the preferred practice of this invention the additives are fed substantially daily for most or all of the active growth cycle.

What is claimed is:

1. The method of growing and fattening swine, ruminants or poultry which comprises orally administering thereto at least one agent selected from the group consisting of 2,3,5-triiodobenzoic acid, 2,5-diiodobenzoic acid and the pharmaceutically acceptable salts, esters, and amides of said acids in an amount to provide an average administration rate corresponding to a daily dosage of about 0.0001% to about 0.1% by weight of the daily feed consumption of said swine, ruminants, or poultry.

2. A method in accordance with claim 1 in which said agent is incorporated in the water supply of the animal.

3. A method in accordance with claim 1 in which said daily dosage is in the range of about 0.0002% to about 0.020% by weight of the daily feed consumption.

4. A method in accordance with claim 3 in which said daily dosage is about 0.01% by weight of the daily feed consumption.

5. An animal feed comprising a major proportion of ingestible plant ingredients, a minor proportion of mineral ingredients, and from about 0.0001% to about 0.1% by weight of at least one material selected from the group consisting of 2,3,5-triiodobenzoic acid and 2,5-diiodobenzoic acid.

6. A feed composition in accordance with claim 5 in which said material is in the range of about 0.0002% to about 0.020% by weight.

7. A feed composition in accordance with claim 6 in which said material is 2,3,5-triiodobenzoic acid.

8. A feed composition in accordance with claim 5 which includes up to about 0.01% of a tetracycline antibiotic.

9. A feed composition in accordance with claim 6 which includes about 0.0025% to about 0.0075% by weight of a tetracycline antibiotic.

10. A feed composition in accordance with claim 7 which contains about 0.0025% by weight of chlortetracycline and about 0.0025% by weight of bacitracin.

References Cited

UNITED STATES PATENTS

| | | | |
|---|---|---|---|
| 2,906,622 | 9/1959 | Lewis | 99—9 |
| 3,304,227 | 2/1967 | Loveless | 99—2 AB |
| 3,341,417 | 9/1967 | Sinaiko | 424—4 |

FOREIGN PATENTS

| | | | |
|---|---|---|---|
| 517,382 | 1/1940 | Great Britain | 260—515 |

OTHER REFERENCES

Medical World News, vol. 6(45), pp. 132–133, 1965.
Merck, Veterinary Manual, pp. 1146–47, 1961.

ALBERT T. MEYERS, Primary Examiner

V. D. TURNER, Assistant Examiner

U.S. Cl. X.R.

424—227, 317; 99—2 G